June 12, 1962   W. G. CALDER   3,038,631
PIPE STOPPER PLUG
Filed April 1, 1960
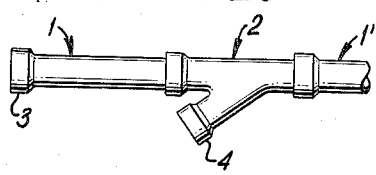
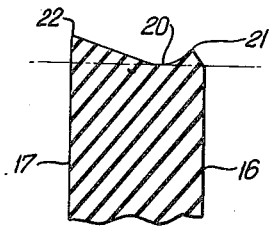
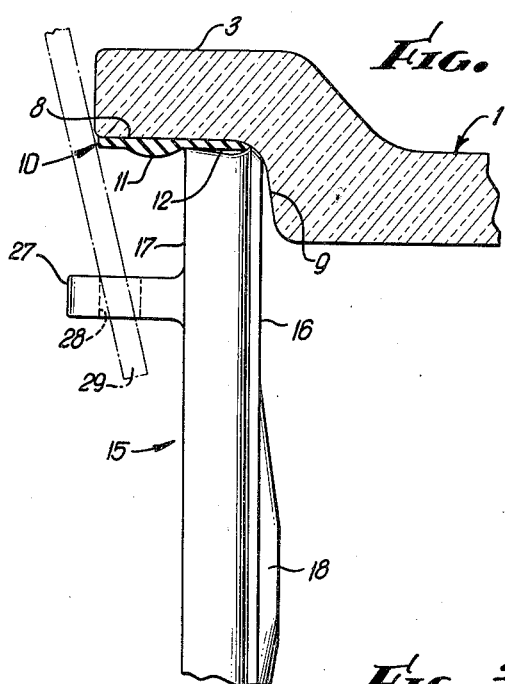
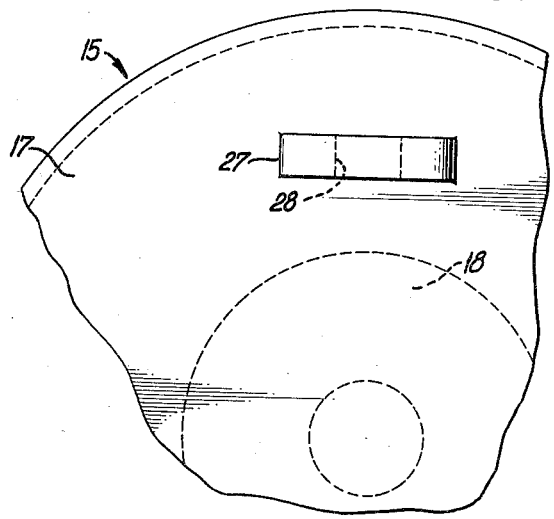
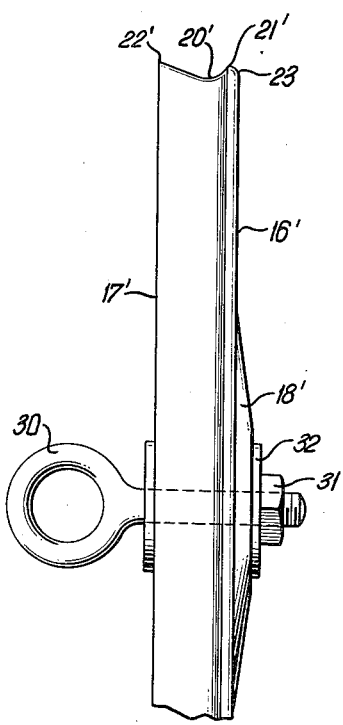
INVENTOR.
WILLIAM G. CALDER
BY Miketta and Glenny
ATTORNEYS.

United States Patent Office 3,038,631
Patented June 12, 1962

1

3,038,631
PIPE STOPPER PLUG
William G. Calder, Los Angeles, Calif., assignor to Joints, Inc., Culver City, Calif., a corporation of California
Filed Apr. 1, 1960, Ser. No. 19,387
7 Claims. (Cl. 220—46)

This invention relates to a readily insertable stopper plug for use in various soil lines, sewer lines, water lines, etc., particularly lines and conduits made from ceramic pipe, either of the plain-end or bell-end type.

Whenever soil lines and sewer lines are laid there are large numbers of open terminals left, these open terminals being defined for subsequent attachment to laterals or offset distributors or supply lines. In other instances, open terminals are left for the purpose of providing cleanout plugs or openings, or for the purpose of permitting the line to be tested to determine the presence or absence of leaks. Obviously these open terminals have to be closed or plugged in some manner until such time as such terminal is attached to a feeder or branch line. Heretofore these open terminals have been plugged by the use of circular clay discs and mortar. Such mortar plugs are unsatisfactory in that the mortar very often dribbles down into the main pipe line and causes an obstruction. Moreover, such plugs do not withstand the internal water pressure normally found in lines of this character. For example, they will not effectively withstand an internal water pressure on the order of ten to twenty pounds per square inch.

Not only were the prior temporary plugs of an unsatisfactory nature, but they required relatively skilled labor and a great deal of time was consumed in cementing these open terminals. The present invention is directed to a readily insertable stopper plug which responds to pipeline pressure so as to enhance its sealing effect. In other words, the plug is readily inserted and as the internal water pressure rises, it causes the plug to enhance its seating or sealing effect, whereby the plug may withstand pressures on the order of fifteen and twenty pounds per square inch without any difficulty whatsoever. Moreover, the present invention is directed to a premolded plug which does not require cement. The plug, generally stated, is a premolded article capable of being readily inserted in that the edge areas of the substantially disc-like or cylindrical plug are flexible and resilient, whereas the central, circular area of the plug is relatively rigid and so arranged as to translate the internal water pressure within the pipe into a sealing resultant between the edge of the disc and the internal surface of the pipe or bell end into which it has been inserted. Moreover, in a preferred form of the invention, means are provided whereby the plug may be readily removed without damage to the pipe whenever it is desired to attach a branch line or gain access to the main pipeline or conduit.

It is an object of the present invention, therefore, to disclose and provide a premolded or preformed, readily insertable, disc-like stopper plug for the open terminals of plain-end and bell-end pipe.

Another object of the invention is to disclose and provide a preformed, readily insertable, stopper plug for the open terminals of pipelines, the plug responding to pipeline pressure so as to enhance its sealing effect with the internal surface of the pipe.

A still further object of the invention is to disclose and provide a stopper plug for open terminals of bell-end type pipelines, the plug having a novel and unique edge structure which resiliently contacts the internal surface of a pipe, such edge structure responding to internal pressures within the pipeline so as to more effectively seal the edge areas of the plug against the internal surfaces of the pipe.

2

These and various other objects and advantages of the present invention will become apparent to those skilled in the art from the following description of certain exemplary forms of the invention. In order to facilitate description and understanding, reference will be had to the appended drawings, in which:

FIG. 1 illustrates rather diagrammatically an end portion of a pipeline of bell-end sections and provided with open terminals which require plugging.

FIG. 2 is an enlarged, axial section through a bell end provided with a plug of the present invention.

FIG. 3 is a rear or outer elevation of a plug of the type shown in FIG. 2.

FIG. 4 is a greatly enlarged section of an edge portion only of a plug of the present invention.

FIG. 5 is a transverse section of a modified type of stopper embraced by the present invention.

A bell-end soil or sewer line, made of ceramic pipe provided with bell ends and spigot ends is illustrated in FIG. 1 and it will be noted that the length of pipe 1 is connected to another length of pipe 1' by means of a Y or branch fitting 2. The bell-end portions 3 and 4 may require to be plugged or stopped by means of a suitable stopper. It would be readily understood that in the event open terminal 4 were to be filled with cement, mortar or other material of this nature, some of the mortar could readily enter the main section of the Y and impede the movement of fluid from pipe section 1' to pipe section 1. The present invention permits open terminals, such as 3 and 4, to be effectively and thoroughly sealed without danger of plugging the pipe and without the time and effort normally required to plug such open terminals.

FIG. 2 is an enlarged, partial section of the bell end 3 of pipe section 1. The inner, cylindrical surface 8 of the bell-end portion 3 is normally of sufficiently large diameter so as to receive the plain end of the successive piece of pipe and such cylindrical, inner surface 8 normally includes a stop shoulder 9 which is substantially transverse to the axis of the pipe. In view of the normal characteristics of ceramic bodies, shrinkage during firing, manufacturing tolerances, etc., the inside diameter of the cylindrical surface 8 is normally appreciably larger than the outer surface of the plain end of the adjacent section of pipe which is to be inserted therein and for many years the space between the outer surface of the bell-end pipe and inner surface of the bell has been filled with various mastics, cements and other mortar-like materials to form a seal therebetween. More recently, however, the internal surface of the bell has been provided with a molded or cast elastomeric or organic resinous composition. Additional external rings of an elastomer are placed around the outer surface of the plain end of the pipe so that the two ends can then be forced together and make a seal, the preformed elastomeric rings adhering tenaciously to their respective surfaces of the pipe and completely filling the space between the bell and the plain end of the pipe when they are forced together into sealing relation.

FIG. 2 illustrates an elastomeric ring 10 cast or formed on the inner surface 8 of the bell. In the form illustrated it will be noted that this elastomeric ring is provided with an inwardly extending, rounded surface of bead-like form 11 spaced from the stop shoulder 9 of the pipe section. It is to be understood that the present invention is not limited to the use of a stopper plug with a bell end provided with the particular type of elastomeric ring illustrated, but such ring is indicated inasmuch as it is being employed extensively at the present time.

The insertable stopper plug 15 is disc-like and composed of a rubber-like composition; various rubber compositions or synthetic rubber compositions may be employed, as well as certain forms of rubber-like or resilient elastomers, such as for example, the polyurethanes.

It will be noted that a cylindrical elastomeric liner portion 12 having a smooth surface of predetermined diameter spaces the internally extending and somewhat resilient bead 11 from the stop shoulder 9. The thickness of the stopper 15 is correlated to the width of this cylindrical liner portion 12.

The disc-like stopper 15 is provided with an inward or forward face 16 and a rear face 17. The stopper is not symmetrical about a transverse plane passing through the approximate mid-portion thereof and the circumferential edge portion of the stopper is best illustrated in FIG. 4. As there shown, this circumferential edge portion is provided with a concaved, transversely extending edge surface 20, the most inwardly extending portion of such surface 20 having a diameter virtually equal to that of the bell or pipe into which the stopper is to be fitted. The circumferential edge portion is also provided with a forward, relatively blunt, rearwardly inclined marginal edge portion terminating in an outward extension 21 which is of greater diameter than the internal diameter of the bell or pipe into which the stopper is to be fitted.

The disc is also provided with a rear circumferential marginal edge portion terminating in a resilient edge 22 which is of greater diameter than the internal diameter of the pipe or bell and preferably greater than the diameter of the edge 21. It will also be noted that in the preferred embodiment illustrated in FIG. 4 the depressed or concave portion 20 has its most depressed portion lying closer to the forward edge 21 than to the rearward marginal edge 22.

The disc-like stopper 15 therefore includes a circumferential edge surface comprising first, second and third portions arranged axially of the stopper from outer face to inner face thereof said first portion tapering from the outer face of the stopper toward its inner face over a major portion of the thickness of the stopper and providing a relatively sharp flexible outer circumferential marginal edge 22, said second portion curvedly flaring from the inner end of said first portion toward the inner face of the stopper and said third portion bluntly tapering from the inner end of said second portion to the inner face of the said stopper and providing a flexible inner marginal edge 21 with a generally concave circumferential edge surface 20 between said outer and inner marginal edges.

The stopper 15 is preferably made of an elastomer or rubber composition having a Shore A hardness of between about 70 and 90. It has been found desirable to use the lower Shore hardness on relatively small diameter pipe, say 4-inch pipe, and the higher Shore hardness on larger diameter pipe, say 6, 8 and 12-inch pipe, and also on those stoppers which are to be used on plain end pipe. By the use of compositions having the hardness indicated the main body of the disc 15 is relatively stiff, but the marginal edge portions 21 and 22 are resilient. However, in order to increase the rigidity and stiffness of the central portion of the disc, it has been found desirable to increase the thickness of the disc in the central area, as for example by providing a conical surface or portion 18 (see FIG. 2). This increased thickness is preferably directed toward the front of the stopper, that is, it is raised above the planar circumferential face 16.

When the stopper of the present invention is inserted into a bell-end pipe, as indicated in FIG. 2, the resilient forward edge readily passes over the inwardly-extending bead 11 formed on the inner surface of the bell and eventually contacts the stop shoulder 9. The rear or trailing circumferential edge 22 also passes over the inwardly-extending bead 11 and engages the inclined inner surface of such bead. When the pipe 1 is filled with water the pressure of the water within the pipe is exerted against the frontal face 16 and a certain amount of flexure occurs in the rim portion of the stopper, causing both the frontal marginal edge 21 and the rear marginal edge 22 to more firmly press against and engage the adjacent portions of the bell. The construction illustrated provides two effective seals between the stopper and the bell of the pipe; the first or marginal edge 21 preventing water from entering the disc portion of the edge of the stopper, and the rearward edge 22 exerting pressure upon the elastomeric liner of the bell and providing a secondary seal. By locating the disc area 20 closer to the front face 16 of the stopper a coupling action is obtained whereby the force of water pressure on the front face 16 of the stopper is translated into a radial, outward thrust of the rear marginal portion 22 against the elastomeric liner within the bell. It is to be understood that when stoppers of the character herein disclosed are used within bells or within plain end pipe which are not provided with elastomeric inner rings of the character illustrated at 10, a similar double sealing action occurs.

Again reference is made to the fact that although the main body of the stopper 15 is relatively rigid and flexes only slightly (in accordance with the Shore hardness of the composition employed) the relatively thinner marginal edge portions 21 and 22 are flexible and therefore can be inserted into a bell-end pipe without damage to whatever elastomeric inner lining 10 is employed.

In order to facilitate the withdrawal of the stopper when such withdrawal is necessary, the rear face 17 of the stopper is preferably provided with an integral radially ported or apertured element extending from the rear face 17 in a zone spaced from the circumferential edge of the disc and from the central section of the disc. Such integral ported or apertured element is illustrated at 27 and the radial port aperture therethrough is indicated at 28. The axis of the aperture or port 28 is substantially transverse to the axis of the pipe. When it is desired to remove the stopper 15 it is only necessary to insert a rigid bar (such as a long screwdriver) into the port 28 and to use such bar (indicated in dash lines at 29) as a pry for the purpose of causing the disc to be withdrawn from the bell.

In the modified form of stopper illustrated in FIG. 5 (wherein similar portions are indicated by prime numerals) the forwardly-directed angular face extending from the front face 16' to the marginal edge 21' is shown curved at 23 (instead of being straight or conical as in FIG. 4). Moreover, instead of employing the eccentrically located, integral, rearwardly extending ported element 27, the stopper is shown provided with an eye bolt 30, the shank of such eye bolt extending through a central aperture in the stopper disc and being provided with a lock nut 31 bearing against a washer 32. An additional washer may be carried against the rear face 17' of the stopper. The construction illustrated in FIG. 5 permits ready removal of large stoppers without the danger of tearing or disfiguring an integral molded projection such as 27 illustrated in FIGS. 2 and 3.

The device has been found to be inexpensive to manufacture, extremely easy to install, and dependable in use. It very effectively restrains much higher pressures within a pipe than any other form of stopper.

All changes and modifications coming within the scope of the appended claims are embraced thereby.

I claim:

1. A readily insertible stopper plug for open terminals of bell end type pipe lines, said plug responding to pipe line pressure to enhance its sealing effect, comprising, in combination with the bell end of a pipe having an inner substantially cylindrical surface merging into a stop shoulder which lies in a plane virtually transverse to the pipe axis, the inner cylindrical surface of said bell end carrying a tenaciously adhering elastomeric sealing ring including a radially inwardly extending circumferential bead spaced from said stop shoulder, the provision of: a disk-like stopper composed of a rubber-like composition and having a Shore A hardness of between about 70 and 90, said stopper having a circumferential edge surface comprising first, second and third portions arranged axially of the stopper from outer face to inner face thereof said first portion tapering from the outer face of the stopper toward its inner face over a major portion of the thickness of the stopper and providing a relatively sharp flexible outer circumferential marginal edge, said second portion curvedly flaring from the inner end of said first portion toward the inner face of the stopper and said third portion bluntly tapering from the inner end of said second portion to the inner face of the said stopper and providing a flexible inner marginal edge with a generally concave circumferential edge surface between said outer and inner marginal edges, the maximum diameter of the outer marginal edge portion being greater than the maximum diameter of the inner marginal edge portion and both said marginal edge portions being greater than the minimum diameter of the inwardly extending bead on said sealing ring, the thickness of said disk-like stopper adjacent its edge being virtually equal to the space between said bead on said sealing ring and stop shoulder of the bell, whereby said stopper may be forced into a bell and be retained therein by engagement of said relatively sharp outer marginal edge portion with said bead.

2. A device as stated in claim 1 wherein the disk-like stopper is provided with a central stiffer section adapted to receive pressure of fluid within the pipe and translate the effect of such pressure into an increased sealing resultant between the edge of the disk and the sealing ring and its bead.

3. A device as stated in claim 1, wherein the outer face of said stopper is provided with an apertured element axially extending from said face in a zone spaced from said circumferential edge surface and from the central section of said disk-like stopper, the axis of the aperture in said apertured element extending substantially radially of the stopper.

4. A readily insertible stopper plug for open terminals of bell end type pipe lines, said plug responding to pipe line pressure to enhance its sealing effect, comprising, in combination with the bell end of a pipe having an inner substantially cylindrical surface merging into a stop shoulder which lies in a plane virtually transverse to the pipe axis, the inner cylindrical surface of said bell end carrying a tenaciously adhering elastomeric sealing ring including a radially inwardly extending circumferential bead spaced from said stop shoulder, the provision of: a disk-like stopper having a circumferential edge surface comprising first, second and third portions arranged axially of the stopper from outer face to inner face thereof said first portion tapering from the outer face of the stopper toward its inner face over a major portion of the thickness of the stopper and providing a relatively sharp flexible outer circumferential marginal edge, said second portion curvedly flaring from the inner end of said first portion toward the inner face of the stopper and said third portion bluntly tapering from the inner end of said second portion to the inner face of the said stopper and providing a flexible inner marginal edge with a generally concave circumferential edge surface between said outer and inner marginal edges, the outer marginal edge portion being of greater diameter than the minimum diameter of said inwardly extending bead, whereby said stopper may be forced into a bell and be retained therein by engagement of said relatively sharp rear outer marginal edge portion with said bead.

5. A device as stated in claim 4 wherein the disk-like stopper is provided with a central stiffer section adapted to receive pressure of fluid within the pipe and translate the effect of such pressure into an increased sealing resultant between the edge of the disk and the sealing ring and its bead.

6. A device as stated in claim 4 wherein the outer face of said stopper is provided with an apertured element axially extending from said face in a zone spaced from the circumferential edge surface and from the central section of said disk-like stopper, the axis of the aperture in said apertured element extending substantially radially of the stopper.

7. A readily insertable stopper plug for open terminals of pipelines, said plug responding to pipeline pressure to enhance its seal effect, comprising in combination with the end of a pipe having an inner substantially cylindrical surface, the provision of a disc-like stopper having a circumferential edge surface comprising first, second and third portions arranged axially of the stopper from outer face to inner face thereof, said first portion tapering from the outer face of the stopper toward its inner face over a major portion of the thickness of the stopper and providing a relatively sharp flexible outer circumferential marginal edge, said second portion curvedly flaring from the inner end of said first portion toward the inner face of the stopper and said third portion bluntly tapering from the inner end of said second portion to the inner face of the said stopper and providing a flexible inner marginal edge with a generally concave circumferential edge surface between said outer and inner marginal edges.

References Cited in the file of this patent

UNITED STATES PATENTS

| | | |
|---|---|---|
| 882,438 | Wilkin | Mar. 17, 1908 |
| 1,993,917 | Byerlein | Mar. 12, 1935 |
| 2,205,825 | Skinner | June 25, 1940 |
| 2,345,887 | Rothrock | Apr. 4, 1944 |
| 2,196,785 | Takiguchi | Apr. 9, 1950 |
| 2,688,995 | Wagoner | Sept. 14, 1954 |
| 2,733,052 | Luther | Jan. 31, 1956 |

FOREIGN PATENTS

| | | |
|---|---|---|
| 803,154 | Great Britain | Oct. 22, 1958 |
| 1,189,568 | France | Mar. 23, 1959 |